United States Patent [19]

Robbins, III

[11] Patent Number: 4,816,316
[45] Date of Patent: Mar. 28, 1989

[54] RIBBED SHEET

[76] Inventor: Edward S. Robbins, III, 459 Noth Ct., Florence, Ala. 26360

[21] Appl. No.: 78,675

[22] Filed: Jul. 28, 1987

Related U.S. Application Data

[63] Continuation-in-part of Ser. No. 013,627, Feb. 11, 1987.

[51] Int. Cl.$^4$ ................................................ B32B 3/28
[52] U.S. Cl. .................................... 428/161; 428/163; 428/167; 428/172
[58] Field of Search ............... 428/156, 161, 162, 163, 428/166, 167, 170, 172, 174

[56] References Cited

U.S. PATENT DOCUMENTS

| | | |
|---|---|---|
| 2,750,631 | 6/1956 | Johnson . |
| 3,233,286 | 2/1966 | Batosti et al. . |
| 3,595,722 | 7/1971 | Dawbarn . |
| 3,746,607 | 7/1973 | Harmon et al. . |
| 3,819,788 | 6/1974 | Grumbach . |
| 3,833,703 | 9/1974 | Joos ........................ 428/163 X |
| 3,984,047 | 10/1976 | Clayton et al. . |
| 4,015,635 | 4/1977 | Goransson . |
| 4,076,121 | 2/1978 | Clayton et al. . |
| 4,315,963 | 2/1982 | Havens . |
| 4,397,246 | 8/1983 | Ishida et al. ............... 428/163 X |
| 4,443,400 | 4/1984 | Herrington . |
| 4,519,860 | 5/1985 | Sharps, Jr. . |
| 4,536,362 | 8/1985 | Donaldson . |
| 4,661,396 | 4/1987 | Andof et al. ................ 428/163 X |
| 4,716,069 | 12/1987 | Burke ............................ 428/167 |

FOREIGN PATENT DOCUMENTS

| | | |
|---|---|---|
| 2508919 | 9/1976 | Fed. Rep. of Germany . |
| 46803 | 3/1968 | Japan . |
| 1402963 | 8/1975 | United Kingdom . |

*Primary Examiner*—Nancy A. B. Swisher
*Attorney, Agent, or Firm*—Nixon & Vanderhye

[57] ABSTRACT

Plastic film and sheet material are provided which have integrally formed surface ribs which are designed to inhibit tears from propagating in one or more selected directions along or across the film or sheet. The ribs may be arranged in laterally spaced parallel rows, or in a criss-cross pattern and may have various cross-sectional shapes.

The film or sheet which may be comprised of polyethylene or other suitable plastic material, may be used as drop cloths, tarpaulins, moisture barriers, mulching and soil erosion control material and so on. The film or sheet may be formed by extrusion, co-extrusion, blown film or other plastic forming techniques.

Thicknesses of the film or sheet between the ribs may range from about 1 mil (or less) up to about 80 mil, with thicknesses through the ribs of about 3 to about 500 mil.

10 Claims, 2 Drawing Sheets

RIBBED SHEET

This invention is a continuation-in-part of the invention entitled "Ribbed Enclosure", Ser. No. 013,627, filed Feb. 11, 1987. The disclosure of this earlier application is hereby incorporated in its entirety in this application.

BACKGROUND AND SUMMARY OF THE INVENTION

Thin plastic film and sheet material are produced in many sizes and thicknesses for various applications. For example, smooth polyethylene film and sheet are put to such widely diverse uses as drop cloths, tarpaulins, moisture barriers, mulching and soil erosion control material, and, of course, they are widely used in the packaging and container industry. Indeed, agricultural, industrial and domestic uses of plastic film and sheet material are too numerous to mention.

One significant negative factor associated with the use of thin plastic film and sheet, however, is a tendency to tear under load. Of course, once a tear is initiated, it tends to extend across the entire sheet in greater or lesser degrees of repidity. This is particularly true in cases where the film or sheet is used in outdoor environments and exposed to wind and the elements, as in the case of tarpaulins, and landscaping, landfill, and mulching films.

It is the primary object of this invention to provide thin plastic film and sheet material which retains all of the benefits of conventional plastic film and sheet material, but which also minimizes or prevents the propagation of any tear which might form in the film or sheet.

In the present invention, thin plastic film and sheet material are formed with a plurality of integrally formed surface ribs which may be arranged in any number of configurations. For example, in the case of rectangular or square film or sheet, a series of laterally spaced, parallel ribs may extend from one end of the sheet to the other. In another embodiment, a criss-cross or lattice-type rib arrangement may be utilized. It is also contemplated that a diagonal, or diamond-shaped arrangement, as well as any other suitable rib pattern may be employed.

It will also be appreciated that the ribs themselves may be formed in various configurations. For example, all of the ribs may extend from only one of an upper and lower surface of the sheet; all of the ribs may extend from both upper and lower surfaces of the sheet; or, adjacent ribs may alternately extend from upper and lower surfaces of the sheet.

In addition, the ribs may have any desired cross-sectional shape, such as rectangular, square, semi-circular, triangular, etc.

The material used to form the film and sheet material is a plastic material, preferably high, medium or low density polyethylene.

In manufacturing plastic film and sheet material according to this invention, any conventional plastics forming technique such as blown film, extrusion and co-extrusion, may be used. Regardless of which technique is utilized, the resultant sheet or film is formed as a unitary article with integral ribs arranged as desired.

With respect to film and sheet thickness, it is sometimes stated that plastic material having a thickness of 10 mil or less is regarded as a "thin film", while material having a thickness over 10 mil is regarded as a "sheet". For purposes of this invention, both thin film and sheet are included.

Thus, plastic material in accordance with this invention may have a thickness in the web area between the ribs from about 1 mil (or less) up to about 80 mil, and a thickness through the ribs of about 3 to about 500 mil, depending on the ultimate use of the material. For example, lightweight drop cloths, mulching film, vapor barriers and the like would normally be constructed of thin film plastic material. Outdoor tarpaulins and the like would typically be constructed on thicker, flexible plastic sheet material. In all such cases, the problem of tearing is present and thus, this invention has equal applicability to both thin film and sheet plastic.

By providing integrally formed ribs along one or more surfaces of the film of sheet material, tears are prevented, or at the very least inhibited, from propagating across the sheet, and, at the same time increased strength is obtained as well.

Other objects and advantages of the subject invention will become apparent from the detailed description which follows.

DETAILED DESCRIPTION OF THE INVENTION

Figure 1:
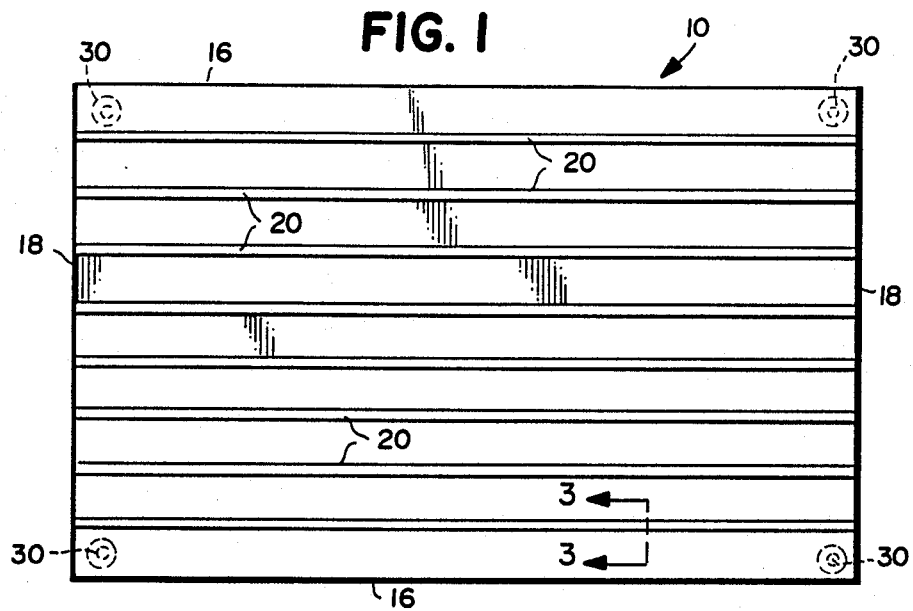
FIG. 1 is a top view of an exemplary embodiment of the invention.
Figure 2:
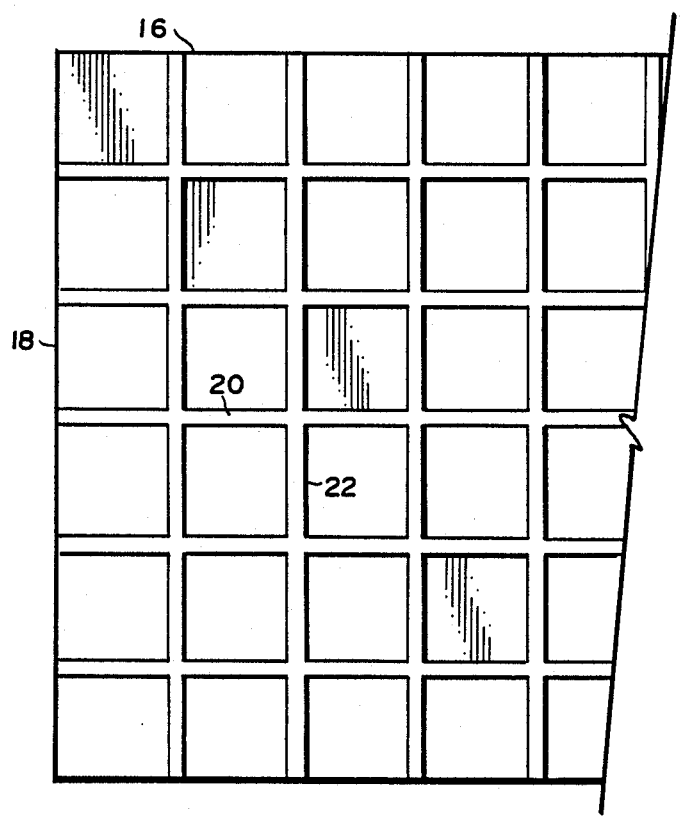
FIG. 2 is a partial top view of an alternative exemplary embodiment of the invention.
Figure 3:
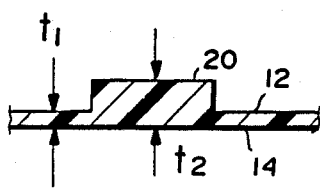
FIG. 3 is a cross-sectional view taken along the line 3—3 of FIG. 1.

With reference to FIGS. 1–3, there is shown flexible, plastic material 10 which may be in film or sheet form, having an upper surface 12, a lower surface 14, and peripheral side edges 16, 18. In the example illustrated in FIG. 1, the material 10 is rectangular, with the side edges 16 defining a length dimension, and side edges 18 defining a width dimension. It will be understood, however, that the film or sheet, while preferably at least initially formed in rectangular form (as determined by the chosen manufacturing technique), nevertheless may ultimately be refined to any suitable shape, such as square, round, triangular or even irregular by conventional cutting techniques.

Referring again to the embodiment illustrated in FIG. 1, the film or sheet is provided with a plurality of integral ribs 20. The ribs 20 are arranged in a laterally spaced relationship and extend substantially between edges 18, 18 in the length direction. In the preferred embodiment, ribs 20 are in a parallel relationship, but it should be understood that the ribs need not always be in such a parallel relationship.

With reference now to FIG. 3, it may be seen that the film or sheet has a thickness $t_1$ in web areas between the ribs 20, and a thickness $t_2$ measured through the ribs. With respect to thickness, it is the intent of this particular disclosure to define "thin film" as any plastic material having a thickness up to about 10 mil. "Sheet", on the other hand, refers to those plastic materials generally above about 10 mil in thickness. As noted before, this invention relates to both plastic film and sheet. For example, as previously noted, plastic material used as painter's drop cloths or as landscaping material may be film in the range of about 1–10 mil, while tarpaulins and the like may be about 80 mil or more in thickness.

For thin film applications, where the thickness $t_1$ of the film area can go up to about 10 mil in thickness, the thickness $t_2$, measured through ribs, may be from about 3 to 50 mil or more.

Similarly, for sheet applications where the thickness $t_1$ is between about 10 and about 80 mil, rib thickness may be in the area of about 30 to about 500 mil.

Figure 4:
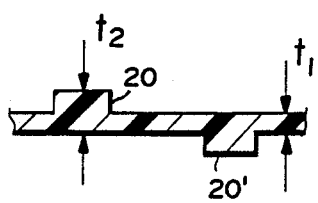
FIGS. 4 and 5 illustrate alternative cross-sectional constructions of the invention.
Figure 5:
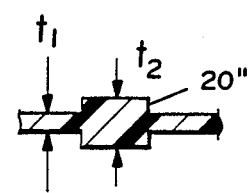

Returning to FIG. 3, it may be seen that rib 20 extends from only the upper surface 12 of the film of sheet 12. However, other rib configurations are contemplated and may be advantageous depending on the particular application. For example, as shown in FIG. 4, adjacent ribs 20, 20' extend from opposite surfaces of the film or sheet. In FIG. 5, a rib 20" is shown which extends from both upper and lower surfaces of the material.

It will further be appreciated that ribs 20, which are illustrated as having a rectangular cross-section in FIGS. 2 and 3, may have any of several cross-sectional shapes, such as square, triangular, semi-circular, and so on.

Whether the ribs protrude from one or both of the upper and lower surfaces of the sheet or film, and whether the ribs are rectangular, square, or semi-circular in cross-section, the rib arrangement in FIG. 1 inhibits tears from propagating across the sheet, primarily in the width dimension, i.e., between side edges 16, 16. Of course, tears that extend in any direction which intersect one of the ribs will be inhibited or prevented from further extension.

Referring now to FIG. 2, an alternative rib configuration is disclosed wherein a first plurality of spaced, parallel ribs 20 extend in a first direction, and a second plurality of spaced parallel ribs 22 extend in a second direction substantially perpendicular to the first direction. This creates a "criss-cross" pattern which is effective to inhibit or prevent propagation of tears in the plastic material in any direction. It should be noted that any number of rib configurations may be utilized. However, the arrangements illustrated in FIGS. 1 and 2 are preferred insofar as they are easily incorporated into conventional plastic material forming processes, such as blown film, extrusion and thermoforming extrusion processes.

With respect to the embodiments in both FIGS. 1 and 2, the lateral spacing between the ribs 20 and/or 22 may be varied as desired, consistent with overall objectives and requirements relating to strength, flexibility and the like. Thus, as more ribs are added, tears are, of course, confined to smaller areas, and overall strength is increased, but at the sacrifice of some flexibility.

Moreoever, as in the case of thickness, spacing of ribs will also be affected by the ultimate end use of the product. For example, in the case of heavy duty outdoor tarpaulins, it may be desirable to provide a greater number of ribs than, for example, in the case of mulching or landscaping films or the like. In all cases, it is contemplated that lateral spacing between adjacent ribs will be at least ⅛ inch.

The preferred plastics composition for film or sheet in accordance with this invention is polyethylene, although any other suitable flexible plastic material may be used. With respect to polyethylene, it will be understood that low density (LDPE), medium density (MDPE) or high density (HDPE) polyethylene, may be employed, depending, again, on the ultimate use of the film or sheet. For example, HDPE exhibits higher tensile strength, and is also the most opaque of the aforedescribed films. LDPE exhibits a higher tendency to elongate under load because of its lower tensile modulus.

In any event, it is within the skill of the art to choose the appropriate polyethylene composition for a given application of the film or sheet material of this invention. For example, for heavy duty tarps and the like, HDPE may be the material of choice, with a thickness upwardly of 80 mil in the area between the ribs, and as much as 500 mil or more through the ribs. In this regard, and with reference to FIG. 1, when the sheet is to be used as a tarp, it is preferably formed with a plurality of apertures 30 to facilitate typing or otherwise fastening the tarp to the item or items to be covered, with or without associated fastener elements.

For mulching material, lightweight tarps and the like, thin film HDPE, MDPE or LDPE material is preferred.

As indicated previously, the film or sheet may be formed by any conventional plastic forming technique including extrusion, blown film, co-extrusion, and thermoforming processes. The co-extrusion process is utilized particularly when it is desired to use more than one plastic composition in the forming of the film or sheet. For example, with reference to FIG. 1, it may be desirable to form ribs 20 of a HDPE material, while forming the area between the ribs of a LDPE material. This is easily accomplished with conventional co-extrusion processes.

Figure 6:
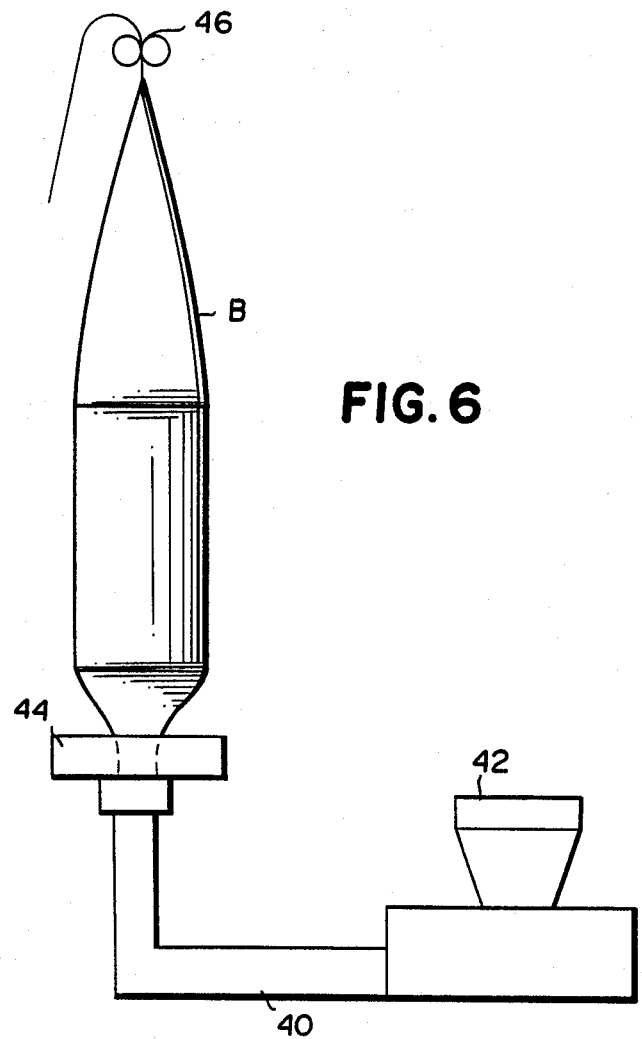
FIG. 6 illustrates, in schematic form, a conventional blown film apparatus which may be utilized in conjunction with the invention.

Turning now to FIG. 6, there is illustrated a blown film system which may be employed to form the film or sheet illustrated in FIGS. 1–5 hereof. Particularly, the blown film system includes an extruder 40 connected to one end to a hopper 42 which receives raw plastic material. The extruder plasticizes the material and feeds the plasticized material to a die head 44. Die head 44 includes opposed mold platens which form a generally circular slit through which platic material issues in the form of a cylindrical think film which forms a bubble B upstanding from die head 44. One or both of the mold platens are formed with grooves circumferentially spaced around the slit in order to extrude from the die head a cylinder of plastic material having ribs and webs and which constitute the bubble B. The grooves may be formed in the inner surface of the outer mold platen or on the outer surface of the inner mold platen depending on whether the ribs of the enclosure produced thereby are intended to lie externally or internally of the enclosure, respectively. The grooves may also be formed alternately on the mold platens or in registry one with the other on the opposite mold platens. Grooves may be provided as desired to accommodate the location of the ribs vis-a-vis the webs, as illustrated in FIGS. 3–5. In blown film apparatus, air is provided by conventional means to maintain the stability of the bubble B. That is, air supplied within bubble B maintains the latter inflated as the extrudate passes from the die head upwardly between a pair of rolls 28 at the upper ends of bubble B and the blown film apparatus. Because the plastic material forming the bubble B is sufficiently cooled as it moves upwardly, the side walls of the bubble B may be brought together between rolls 46 for passage there-through and without losing definition of the ribs and webs.

In a preferred form, soft rubber rolls 46 are provided at the top of the blown film apparatus to accommodate the grooves in the plastic material as it passes through the rollers in doubled sheet form closed along the lateral edges. While some air leakage may be accommodated, it is preferable that the bubble be substantially sealed between the rolls 46 and the die head 44. The ribbed sheet plastic material is taken from the rolls 28 in flattened tubular form to a cutting station, not shown, where the sheet material is slit along its length to form flat film or sheet.

Figure 7:
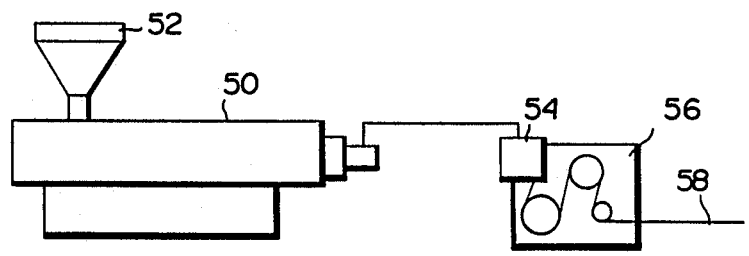
FIG. 7 illustrates, in schematic form, a conventional extrusion apparatus which may also be used in conjunction with the invention.

With reference now to FIG. 7, a conventional film extrusion system is illustrated in schematic form. An extruder 50 receives raw material through the hopper 52 and the material exits casting die 54 in a casting machine 56 as the web or film 58 which is processed through further treatment stations (not shown) and ultimately wound on a roll for storage and/or shipment. The extrusion die is provided with laterally spaced enlargements which define the rib structure which is extruded integrally with the film or sheet.

By incorporating a multi-rib configuration into the film or sheet, barriers are, in effect, placed in the way of any tear which might be initiated, either at one or more edges of the sheet, or in an area between the ribs. With reference again to FIG. 1, it will be appreciated that ribs 20 will inhibit tears in any direction but one parallel to the ribs. The effectiveness of these ribs may nevertheless be enhanced by orienting the plastic in the direction of extrusion so that the material is strongest in the direction of the ribs, thus lessening the likelihood of that any tear initiated in the transverse direction will be able to propagate across the weaker dimension of the sheet or film.

The criss-cross pattern of FIG. 2, and other patterns, such as a diamond lattice, for example, prove effective as tear inhibitors for tears in any direction, and thus, orientation of the plastic is not as great a concern.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A unitary plastic film comprising upper and lower surfaces and including at least a first array of longitudinally extending solid ribs formed integrally within said film and spaced laterally, one from the other, wherein the thickness of the film between the ribs is no more than about 10 mil and the thickness of the ribs is no more than about 50 mil, and wherein the ribs comprise high density polyethylene and the film between adjacent ribs comprise low density polyethylene.

2. A film as defined in claim 1 and further including a second array of spaced ribs extending substantially transversely of said first array.

3. A film as defined in claim 1 wherein said ribs extend from one of said upper and lower surfaces of said film.

4. A film as defined in claim 1 wherein each of said ribs extend from both said upper and lower surfaces of said film.

5. A film as defined in claim 1 wherein adjacent ribs extend alternately from said upper and lower surfaces of said film.

6. A unitary plastic sheet comprising upper and lower surfaces and including at least a first array of longitudinally extending solid ribs formed integrally within said sheet and spaced laterally, one from the other, wherein the thickness of the sheet between the ribs is about 10 to about 80 mil and the thickness of the ribs is about 30 to about 500 mil, and wherein the ribs comprise high density polyethylene and the sheet between adjacent ribs comprises low density polyethylene.

7. A sheet as defined in claim 6 and further including a second array of spaced ribs extending substantially transversely of said first array.

8. A sheet as defined in claim 6 wherein said ribs extend from one of said upper and lower surfaces of said sheet.

9. A sheet as defined in claim 6 wherein each of said ribs extends from both said upper and lower surfaces of said sheet.

10. A sheet as defined in claim 6 wherein adjacent ribs extend alternately from said upper and lower surfaces of said sheet.

* * * * *